L. FARNHAM.
SHIP RAISING DEVICE.
APPLICATION FILED AUG. 10, 1918.

1,300,943.

Patented Apr. 15, 1919.
2 SHEETS—SHEET 1.

Inventor
Leonard Farnham
By Victor J. Evans
Attorney

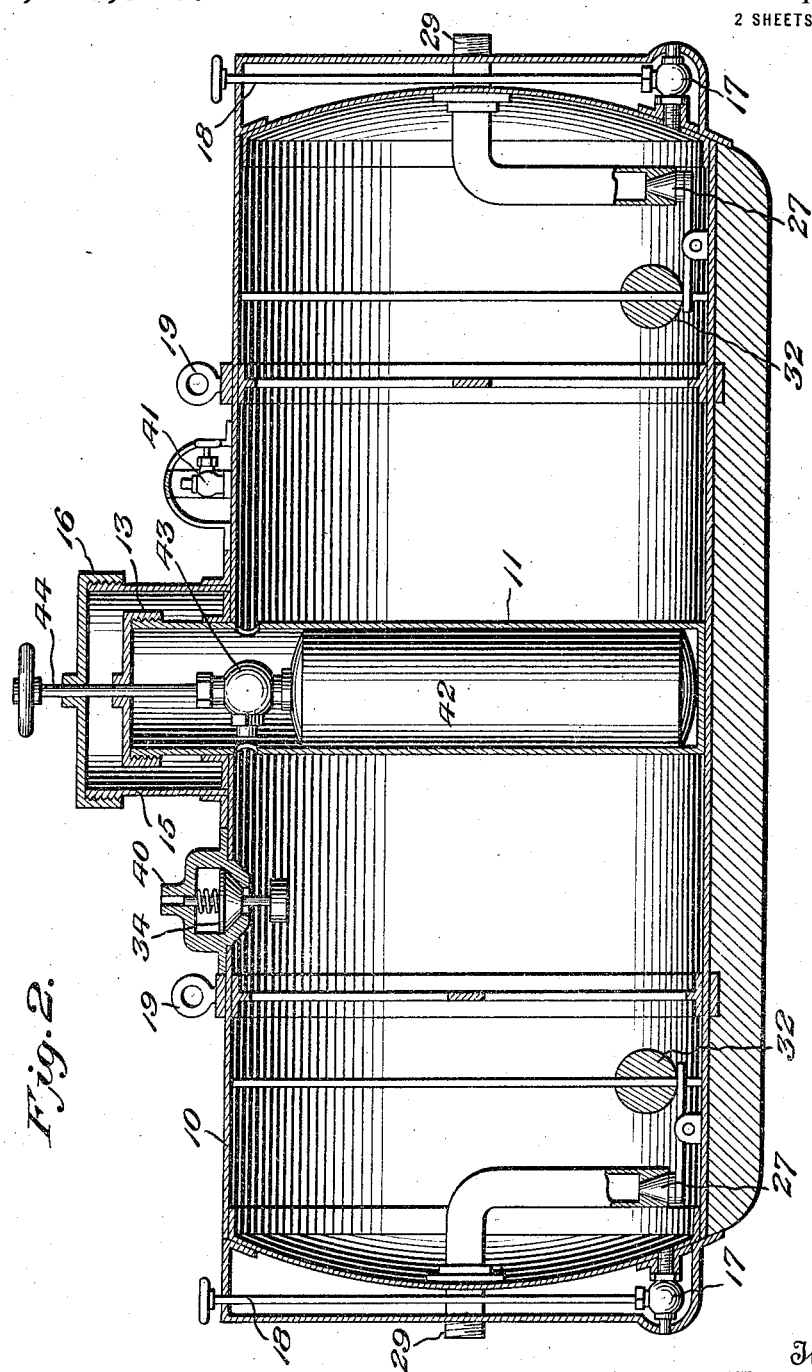

UNITED STATES PATENT OFFICE.

LEONARD FARNHAM, OF NEW YORK, N. Y.

SHIP-RAISING DEVICE.

1,300,943.  Specification of Letters Patent.  Patented Apr. 15, 1919.

Application filed August 10, 1918.  Serial No. 249,304.

*To all whom it may concern:*

Be it known that I, LEONARD FARNHAM, a citizen of the United States, residing at New York, in the county of New York and State of New York, have invented new and useful Improvements in Ship-Raising Devices, of which the following is a specification.

This invention relates to devices for raising sunken vessels and aims to provide a tank or hollow body adapted to be filled with water and sunk for attachment to the vessel, the tank containing a gas generator which is removably positioned therein and operated from the outside of the tank to cause a mixture of the gas generating elements.

The invention also aims to provide novel means for holding the gas generator closed until sufficient gas has been generated to displace the water, when the generator is automatically opened the water escaping through outlet valves which are automatically closed after the water has been removed, the tank then being filled with gas to add to its buoyancy. It is of course obvious that any number of tanks may be used, their number being regulated by their capacity and the weight of the vessel to be raised.

In the drawings:—

Fig. 2 is a similar view showing the modified form of the invention.

Figure 1:
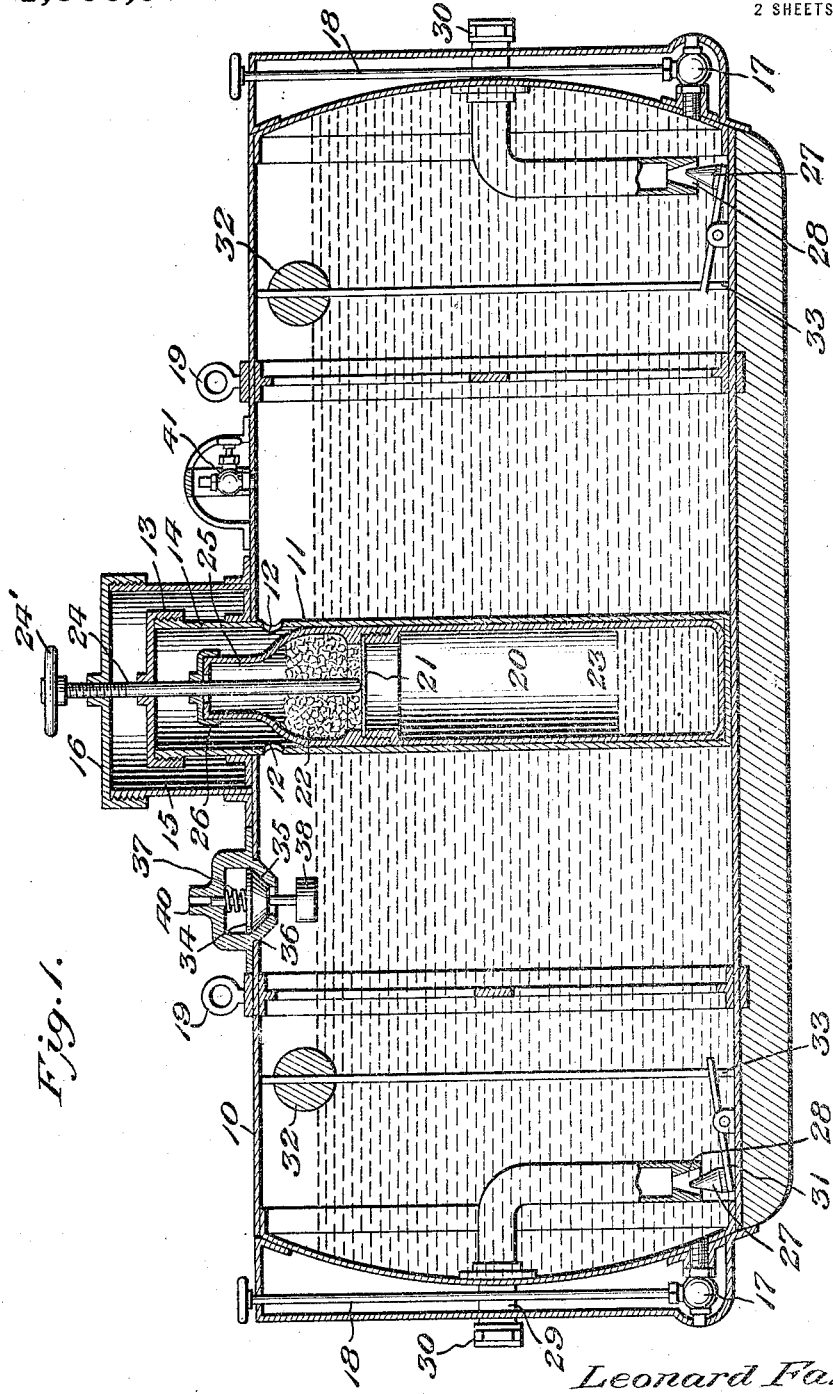
Figure 1 is a sectional view through a tank constructed in accordance with the present invention.

Referring to the drawings in detail and particularly to Fig. 1 there is shown a tank 10 which may be of any suitable shape or size. This tank is provided with a centrally located compartment 11 which communicates with the interior of the tank proper through openings 12, the compartment being closed by a threaded cover 13, which is removably secured upon a sleeve or neck 14 disposed concentrically with and forming a continuation of the compartment 11. The sleeve 14 is surrounded by a sleeve 15, which is secured to the tank and is closed by a threaded cover 16. Located upon opposite sides of the tank 10 are sea cocks 17, which are controlled by valve stems 18 and are open for the purpose of filling the tank with water so that it may be easily submerged for attachment to a sunken vessel, the tank being provided with rings 19 for the passage of suitable chains or cables by means of which the tank may be secured to the vessel.

The compartment 11 is adapted for the reception of a generator 20 for the formation of a gas, preferably hydrogen gas, which is formed by a mixture of potassium and water, although any suitable alkaline substance may be employed for mixture with the proper acid or fluid for the formation of gases of various natures. For the purpose of forming hydrogen gas, the generator 20 is divided into separate compartments through the medium of a glass partition 21, although any other brittle or easily broken material may be substituted for the glass. The potassium is adapted to be placed in the upper compartment 22 within the generator and a sufficient quantity of water in the lower compartment 23, while a threaded rod 24 extends through the lids 13 and 16 into the generator and in contact with the glass partition 21. The outer end of this rod is provided with an operating handle 24', so that it may be readily operated and forced against the partition 21 for the purpose of breaking the glass and permitting the potassium to mix with the water in the chamber 23. The generator 20 is preferably provided with a restricted neck portion 25, the mouth thereof being closed by a water tight cap 26, the latter being securely held in position by water within the sleeve 14 which presses upon the cap.

After the tank has been secured to the sunken vessel the sea cocks 17 are closed and the threaded rod operated to break the glass 21 for the purpose of mixing the potassium with the water to start the generation of the gas. After sufficient pressure has been created, the gas within the generator will lift the cap 26, escaping from the generator into the tank proper through the ports 12 and displacing the water within the tank.

In order to permit of the escape of the water, outlet valves 27 are provided, the seats 28 of these valves being located in the end of the pipe or passage 29 which extends upon the outside of the tank and is closed by a threaded cap 30. The valve 27 and the seat 28 are of conical formation, the former being located upon the end of a pivoted rod 31, the opposite end of this rod being located in the path of movement of a float 32 which is movable upon a guide 33. As the water passes outward through the valve, the float 32 descends and contacts with the end of the pivoted rod 31, the weight being sufficient to close the valve which is ground within its seat to form a water tight joint.

The tank 10 is also provided with a pressure relief valve 34, which is in the form of a disk engageable with a seat 35 which surrounds a port 36 formed in the tank 10. The valve 34 is normally closed by a spring 37, a weight 38 depending from the under side of the valve acting in conjunction with the spring to resist any open or outward movement, the spring 37 surrounds the valve stem 39 which is guided in a spider 40. If desired the tank may be equipped with a vent cock 41.

In Fig. 2 there is illustrated a modified form of the invention. In this form there is shown in the compartment 11 a tank 42, which may contain gas or compressed air, the said tank being filled and placed within the compartment either previous to or after the sumbergency of the tank 10. After the tank 10 has been secured to the vessel, the tank 42 is opened to release its contents for passage into the tank 10 for the purpose of displacing water therein as previously described, through the medium of a valve 43 which is operated by a valve stem 44 extending without the tank through the lids 13 and 16 after the manner of the threaded rod 24. In other respects the structure is identical of the structure shown and described in Fig. 1 and it is not believed necessary to repeat the same.

The invention is susceptible of various other changes in its form, proportions, and minor details of construction and the right is reserved to make these changes.

Having described the invention, what is claimed is:—

1. A float comprising a hollow body, means whereby the said body may be filled with water to submerge the same, a gas generator within said body, a water tight closure for the generator, having a water contained chamber and an alkali contained chamber, a threaded rod operable from without the body for establishing communication between the chambers to mix the water and alkali for the formation of gas, means whereby the formation of gas within the generator will raise the closure to permit the gas to enter the hollow body and displace the water, a water outlet valve and means for automatically closing the valve after the escape of the water.

2. A float comprising a hollow body, means whereby the said body may be filled with water to submerge the same, a gas generator within said body, a water contained chamber and an alkali contained chamber within the generator, a fragile partition separating the chambers, a water tight closure for the generator, means operable from without the body for destroying the partition to mix the contents of the generator for the formation of gas, whereby the water tight closure will be raised to permit the gas to enter the hollow body and displace the water, a water outlet valve and means controlled by the escape of the water for automatically closing the valve after the water has been emptied from the tank.

3. A float comprising a hollow body, means whereby the said body may be filled with water to submerge the same, a gas generator within said body, a water tight closure for the generator, means operable from without the body for starting the operation of the generator, to raise the closure and permit the gas to enter the hollow body and displace the water, a pivoted water outlet valve and a vertically disposed guide rod located adjacent thereto, a float movable along said rod and engageable with the pivoted valve to automatically close the same after the escape of the water.

4. A float comprising a hollow body, means whereby the said body may be filled with water to submerge the same, a gas generator within said body and communicating with the interior thereof, a water contained chamber and an alkali contained chamber within the generator, a fragile partition separating the chambers, a water-tight closure for the generator to cut off communication with the hollow body, an operating rod extending through the hollow body and the water-tight closure for contacting with the fragile partition to destroy the latter and mix the contents of the generator for the formation of gas, whereby the water-tight closure will be raised to permit the gas to enter the hollow body and displace the water, a water outlet valve and means controlled by the escape of water for automatically closing the valve after the water has been emptied from the tank.

LEONARD FARNHAM.